United States Patent

Masuzawa et al.

(10) Patent No.: US 9,906,699 B2
(45) Date of Patent: Feb. 27, 2018

(54) BLADE DRIVE DEVICE AND OPTICAL APPARATUS

(71) Applicant: SEIKO Precision Inc., Matsudo-shi, Chiba (JP)

(72) Inventors: Koichi Masuzawa, Matsudo (JP); Kenichi Kudo, Matsudo (JP)

(73) Assignee: SEIKO PRECISION INC., Chiba (JP)

( * ) Notice: Subject to any disclaimer, the term of this patent is extended or adjusted under 35 U.S.C. 154(b) by 0 days.

(21) Appl. No.: 15/242,999

(22) Filed: Aug. 22, 2016

(65) Prior Publication Data
US 2017/0075193 A1    Mar. 16, 2017

(30) Foreign Application Priority Data
Sep. 16, 2015    (JP) .................. 2015-182907

(51) Int. Cl.
*H04N 5/225* (2006.01)
*G03B 9/02* (2006.01)
*G03B 9/14* (2006.01)

(52) U.S. Cl.
CPC ............. *H04N 5/2257* (2013.01); *G03B 9/02* (2013.01); *G03B 9/14* (2013.01)

(58) Field of Classification Search
CPC ........... G03B 9/02; G03B 9/14; H04N 5/2257
USPC ....................................... 396/452, 458, 505
See application file for complete search history.

(56) References Cited

U.S. PATENT DOCUMENTS

| 7,978,250 B2 * | 7/2011 | Miyoshi | ................. | G02B 7/021 |
| | | | | 348/335 |
| 2008/0204416 A1 * | 8/2008 | Quercia | ................. | G06F 3/0317 |
| | | | | 345/166 |
| 2011/0293261 A1 * | 12/2011 | Lee | ................. | G03B 35/02 |
| | | | | 396/323 |
| 2017/0054881 A1 * | 2/2017 | Conger | ................. | B60R 11/04 |

FOREIGN PATENT DOCUMENTS

JP    2008-129291 A    6/2008

* cited by examiner

*Primary Examiner* — Clayton E LaBalle
*Assistant Examiner* — Linda B Smith
(74) *Attorney, Agent, or Firm* — Brinks Gilson & Lione (57) ABSTRACT

To provide a blade drive device that may prevent malfunction of blades. A blade drive device includes a base plate having an opening to be opened and closed by a blade on an optical axis, and a flexible substrate having joint portions to which conductor wires of a first actuator and a second actuator that drive the blades are joined, the flexible substrate being provided between the base plate and the blades on one side of the base plate in an axis direction of the optical axis. The base plate is provided with a substrate housing part in which at least a part of the flexible substrate is housed and to which a covering material for covering the joint portions is applied. The substrate housing part is provided with wall surface extending from the other side toward the one side in the axis direction of the optical axis. The wall surface is provided with corner portions extending along a direction crossing the axis direction of the optical axis. The corner portions are provided between the blades and the flexible substrate in the axis direction of the optical axis.

5 Claims, 4 Drawing Sheets

BLADE DRIVE DEVICE AND OPTICAL APPARATUS

RELATED APPLICATIONS

This application claims priority under 35 U.S.C. § 119 to Japanese Patent Application No. 2015-182907 filed on Sep. 16, 2015, the entire content of which is hereby incorporated by reference.

BACKGROUND OF THE INVENTION

Field of the Invention

The present invention relates to a blade drive device and an optical apparatus.

Description of the Related Art

Recently, optical apparatuses such as cameras mounted on cell phones or the like may include blade drive device for improving imaging performance. The blade drive device includes a shutter substrate having an opening, a drive source of blades that open and close the opening, a flexible substrate held by the shutter substrate, and a conductive wire that electrically connects the flexible substrate and the drive source (for example, see Patent Document 1 (JP-A-2008-129291)).

In the blade drive device of related art, the flexible substrate and the wire may be joined by solder. In this case, after the joint of the flexible substrate and the wire, the solder or fluxes contained in the solder may fly as foreign matter, and defects including degradation of image quality due to adherence to an imaging device and malfunction due to adherence to a movable part may be caused.

In order to prevent the defects, a method of preventing flying of the solder and the fluxes by applying a covering material of a resin material such as silicone to a joint portion of the flexible substrate and the wire to cover the solder is considered.

However, when the covering material is applied to the joint portion of the flexible substrate and the wire, the covering material may wetting-spread over the surface of the shutter substrate and adhere to the movable part, and malfunction of the blades may be caused. Therefore, in the blade drive device of related art, there is room for improvement in prevention of malfunction of the blades by definition of an application range of the covering material.

SUMMARY OF THE INVENTION

An object of the invention is to provide a blade drive device that may prevent malfunction of blades.

A blade drive device according to the invention includes a base plate having an opening to be opened and closed by a blade on an optical axis, and a substrate having a joint portion to which a conductor wire of a drive source that drives the blade is joined, the substrate being provided between the base plate and the blade on one side of the base plate in an axis direction of the optical axis, wherein the base plate is provided with a substrate housing part in which at least a part of the substrate is housed and to which a covering material for covering the joint portion is applied, the substrate housing part is provided with a wall surface extending from the other side toward the one side in the axis direction, the wall surface is provided with a corner portion extending along a direction crossing the axis direction, and the corner portion is provided between the blade and the substrate in the axis direction.

When the covering material is applied within the substrate housing part, the covering material wetting-spreads on the wall surface due to surface tension. When the corner portion is provided on the wall surface, wetting-spread of the covering material over the corner portion is restricted.

According to the invention, the corner portion extending along the direction crossing the axis direction is provided between the blade and the substrate in the axis direction, and thus, when the covering material is applied within the substrate housing part, wetting-spread of the covering material from the other side toward the one side in the axis direction in the corner portion of the wall surface may be restricted. Thereby, entrance of the covering material into the position of the blade in the axis direction (i.e., into the working surface of the blade) is prevented, and adherence of the covering material to the movable part of the blade may be prevented. Therefore, the blade drive device that may prevent malfunction of the blade may be obtained.

In addition, wetting-spread of the covering material may be restricted by the corner portion, and thus, the blade can be provided closer to the substrate side in the axis direction. Thereby, the dimension of the blade drive device in the axis direction may be reduced. Therefore, the compact blade drive device may be obtained.

In the above described blade drive device, it is desirable that a blade receiving plate having a receiving plate opening on the optical axis is provided, wherein the blade receiving plate is provided between the blade and the opening, and the corner portion is provided between the blade receiving plate and the substrate.

According to the invention, the corner portion is provided between the blade receiving plate and the substrate, and thus, contact of the covering material with the blade receiving plate may be prevented. Thereby, contact of the covering material with the movable part of the blade via the blade receiving plate may be prevented. Therefore, the blade drive device that may prevent malfunction of the blade may be obtained.

In the above described blade drive device, it is desirable that the base plate is provided with a positioning part stood toward the one side in the axis direction in contact with the substrate, and the positioning part is provided with the corner portion.

According to the invention, the substrate may be positioned by the positioning part, and the corner portion is provided in the positioning part and wetting-spread of the covering material over the working surface of the blade via the positioning part may be prevented. Therefore, the blade drive device that may prevent malfunction of the blade may be obtained.

In the above described blade drive device, it is desirable that a rib is stood from the other side toward the one side in the axis direction in the substrate housing part.

According to the invention, the rib is stood from the other side toward the one side in the axis direction in the substrate housing part, and thus, the covering material applied within the substrate housing part flowing out of the substrate housing part may be restricted by the rib. Thereby, the application range of the covering material may be defined and wetting-spread of the covering material over the working surface of the blade via the outside of the substrate housing part may be prevented. Therefore, the blade drive device that may prevent malfunction of the blade may be obtained.

Further, the rib is provided in the substrate housing part, and thus, strength of the base plate may be improved.

In the above described blade drive device, it is desirable that the drive source that drives the blade is provided, wherein the drive source is provided between a working surface of the blade and the base plate.

According to the invention, the drive source is provided between the working surface of the blade and the base plate and does not enter the working surface of the blade like the covering material in the axis direction, and thus, compared with a configuration in which the drive source is provided outside of the working surface of the blade, malfunction of the blade may be prevented and the dimension of the blade drive device in the axis direction may be reduced. Therefore, the compact blade drive device may be obtained.

An optical apparatus of the invention includes the above described blade drive device.

According to the invention, the above described blade drive device is provided, and thereby, malfunction of the blade may be prevented and the optical apparatus advantageous in imaging performance may be obtained.

According to the invention, the corner portion extending along the direction crossing the axis direction is provided on the wall surface between the blade and the substrate in the axis direction, and thus, when the covering material is applied within the substrate housing part, wetting-spread of the covering material from the other side toward the one side in the axis direction in the corner portion of the wall surface may be restricted. Thereby, entrance of the covering material into the working surface of the blade may be prevented, and adherence of the covering material to the movable part of the blade may be prevented. Therefore, the blade drive device that may prevent malfunction of the blade may be obtained.

DETAILED DESCRIPTION OF THE PREFERRED EMBODIMENTS

As below, embodiments of the invention will be explained with reference to the drawings.

Figure 1:
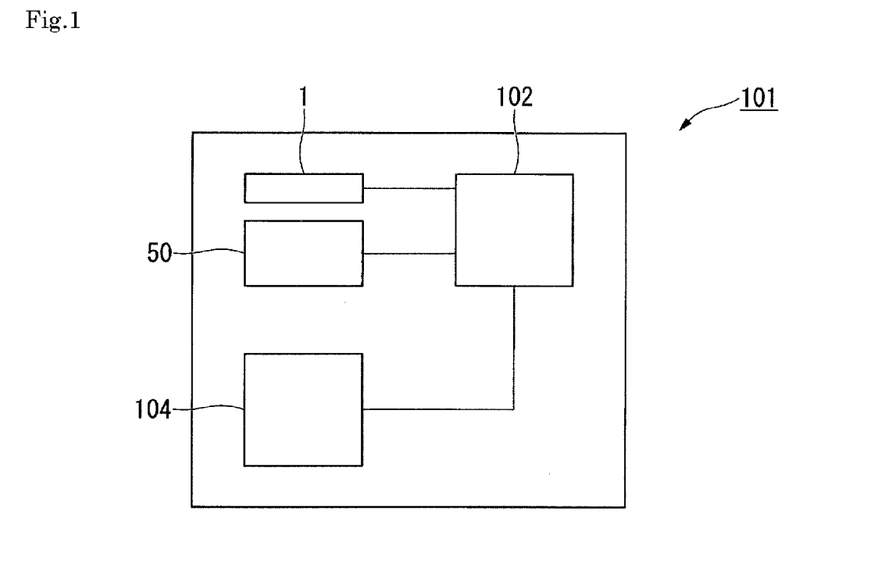
FIG. 1 is a block diagram of an optical apparatus.

FIG. 1 is a block diagram of an optical apparatus.

As shown in FIG. 1, an optical apparatus 101 is a camera mounted on a cell phone or the like, for example, and includes a blade drive device 1, a camera module 50, a control unit 102, and an imaging device 104.

The camera module 50 includes a lens for adjustment of a focal length, a lens drive device that drives the lens, etc.

The control unit 102 controls the entire operation of the optical apparatus 101 and includes a CPU (Central Processing Unit), a ROM (read Only Memory), a RAM (Random Access Memory), etc. The control unit 102 controls the operations of the blade drive device 1 and the camera module 50.

The imaging device 104 is e.g. a CCD (Charge Coupled Device), CMOS (Complementary Metal Oxide Semiconductor) image sensor, or the like, and converts a subject image formed by light into electric signals.

Figure 2:
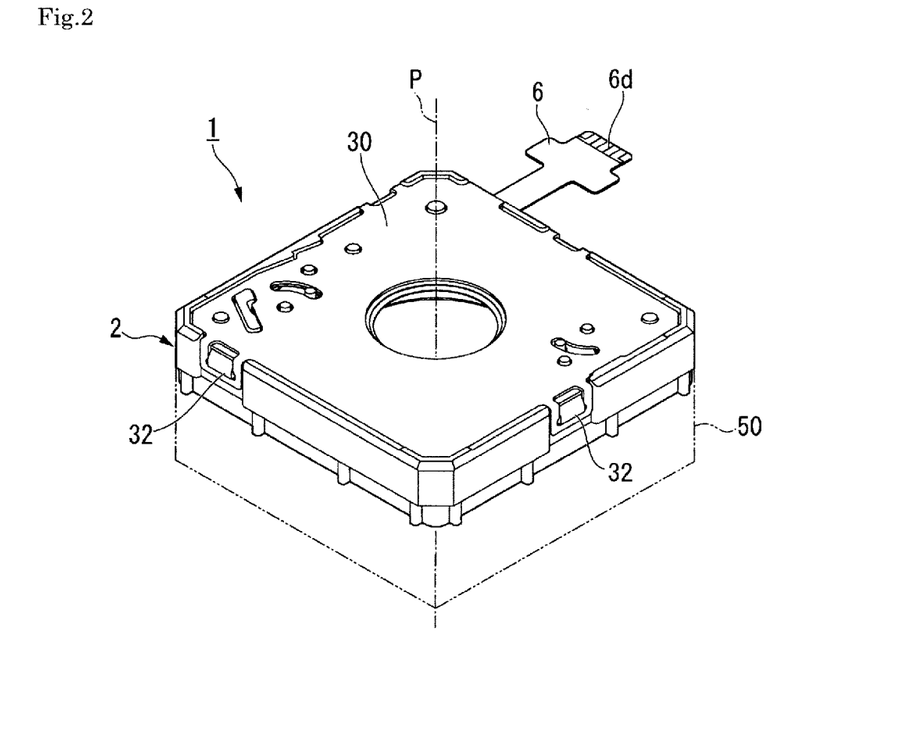
FIG. 2 is a perspective view of a blade drive device.

FIG. 2 is a perspective view of the blade drive device.

As shown in FIG. 2, the blade drive device 1 is formed in a rectangular parallelepiped shape having a thickness in an optical axis P direction (hereinafter, simply referred to as "axis direction") of the lens of the camera module 50 and a rectangular shape as seen in the axis direction. The blade drive device 1 is provided to overlap with the camera module 50 in the axis direction. Note that, in the following explanation, the blade drive device 1 side seen from the camera module 50 in the axis direction is referred to as "outside in the axis direction" and the opposite side is referred to as "inside in the axis direction".

Figure 3:
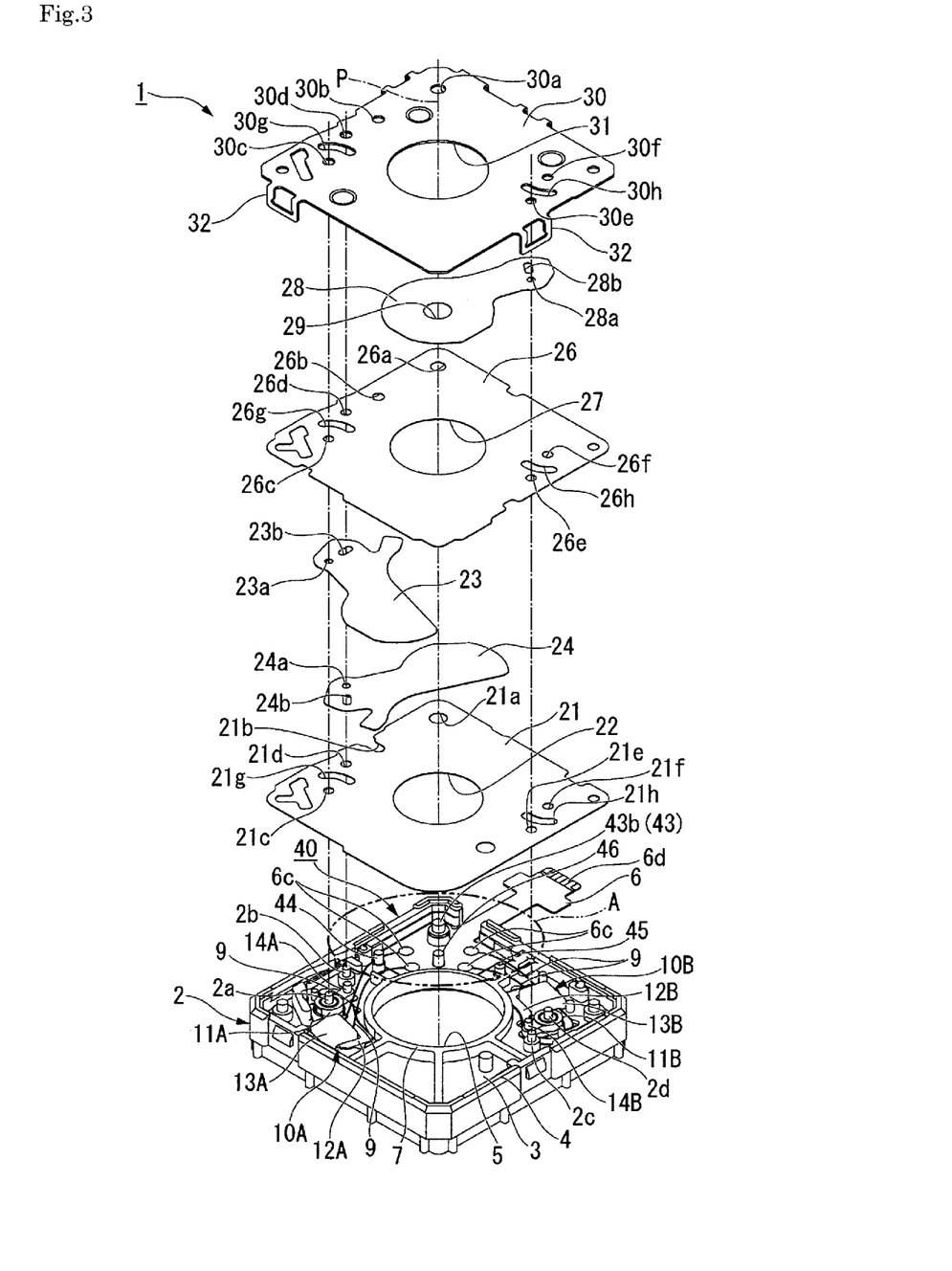
FIG. 3 is an exploded perspective view of the blade drive device.

FIG. 3 is an exploded perspective view of the blade drive device.

As shown in FIG. 3, the blade drive device 1 includes a base plate 2 having an opening 5 on the optical axis P, a first shutter blade 23, a second shutter blade 24, and an aperture blade 28 provided outside of the opening 5 in the axis direction for restricting the opening 5, a first actuator 10A (drive source) that drives the respective shutter blades 23, 24, a second actuator 10B (drive source) that drives the aperture blade 28, and a flexible substrate 6 (substrate) having joint portions 6c in which conductor wires 9 of the respective actuators 10A, 10B are joined. Note that the restriction of the opening 5 by the respective blades 23, 24, 28 refers to adjustment of the opening area of the opening 5.

The base plate 2 is formed using e.g. a resin material, and forms an outer shape of the blade drive device 1. The base plate 2 has a base part 3 in a rectangular plate shape and a peripheral wall part 4 in a rectangular frame shape stood from the outer peripheral edge of the base part 3 to the outside in the axis direction. At the center of the base part 3, the opening 5 penetrating the base part 3 in the axis direction is formed around the optical axis P. In the opening edge of the opening 5, an annular opening wall part 7 stood from the base part 3 to the outside in the axis direction is formed. The end of the opening wall part 7 on the outside in the axis direction is formed in a flat surface orthogonal to the axis direction.

Figure 4:
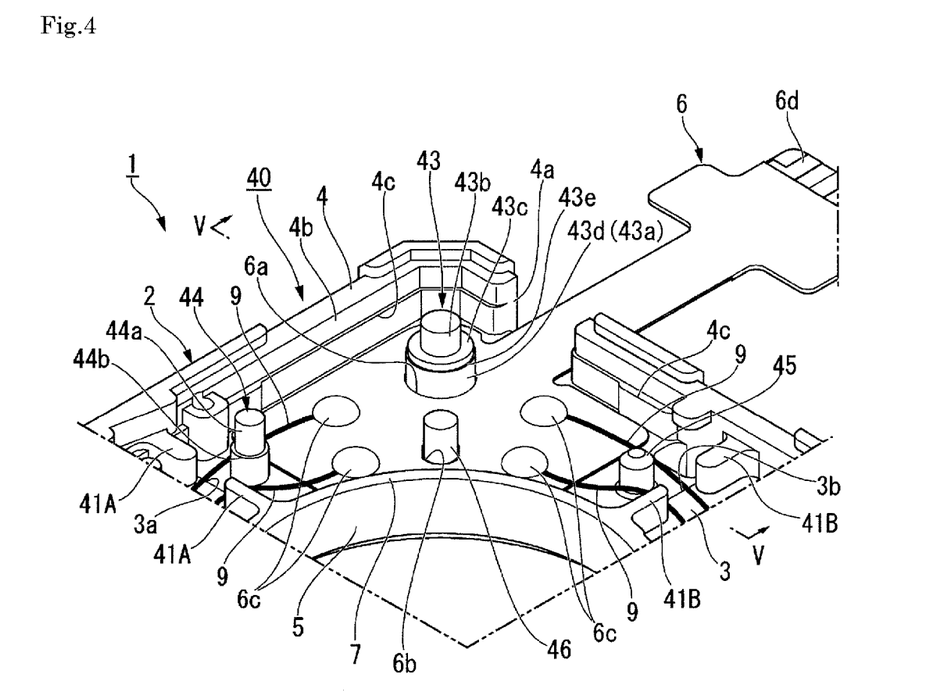
FIG. 4 is an enlarged view of part A in FIG. 3.
Figure 5:
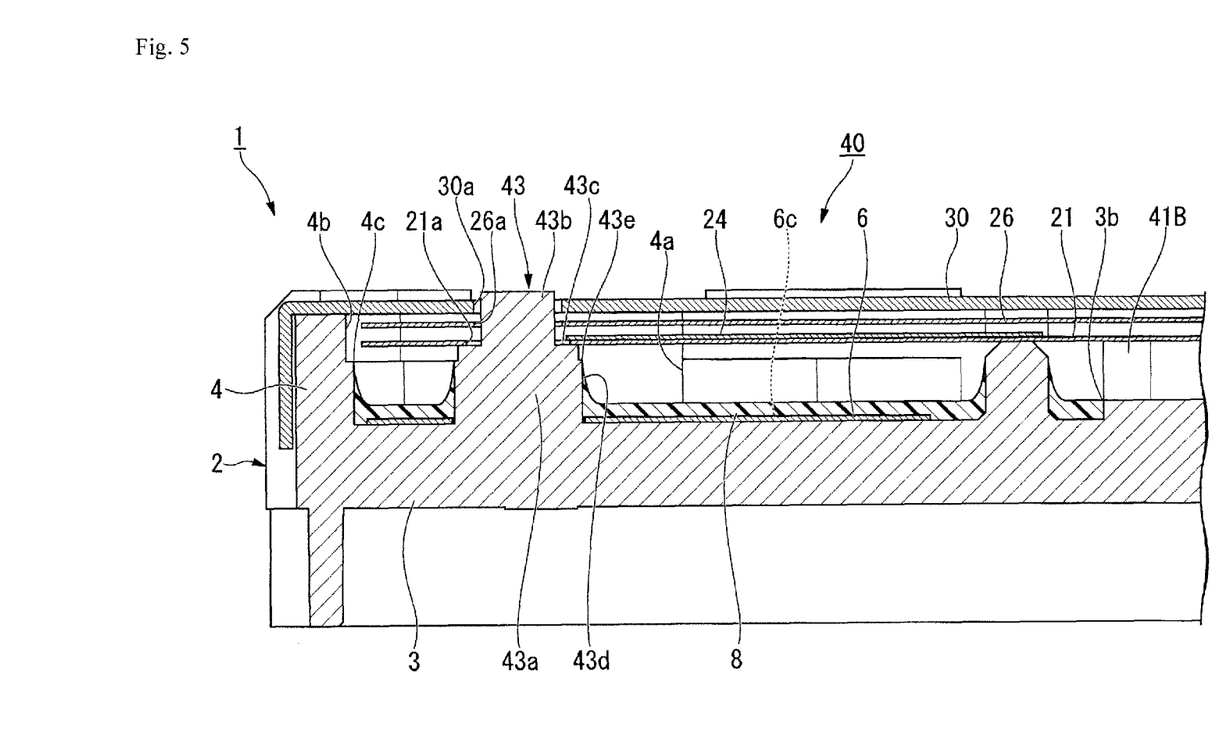
FIG. 5 is a sectional view along line V-V in FIG. 4.

FIG. 4 is an enlarged view of part A in FIG. 3. FIG. 5 is a sectional view along line V-V in FIG. 4.

In a corner region of the base plate 2, a substrate housing part 40 sandwiched by the peripheral wall part 4 and the opening wall part 7, in which a part of the flexible substrate 6 is housed and to which a covering material 8 (see FIG. 5), which will be described later, is applied is provided. As shown in FIG. 4, in the substrate housing part 40, ribs 41A, 41B are stood from the base part 3 to the outside in the axis direction. The ribs 41A, 41B are respectively provided between the respective intermediate parts of two sides forming the substrate housing part 40 of the four sides forming the outer shape of the peripheral wall part 4 and the opening wall part 7. The ribs 41A, 41B are provided along the respective radial directions of the optical axis P (hereinafter, simply referred to as "radial directions"). The ribs 41A, 41B are divided in intermediate portions in the respective radial directions and the conductor wires 9 that connect the respective actuators 10A, 10B and the flexible substrate 6 are provided in the gaps. The ends of the ribs 41A, 41B on the outside in the axis direction are formed in flat shapes orthogonal to the axis direction and flush with the end of the opening wall part 7.

The base part 3 in the substrate housing part 40 is evenly recessed toward the inside in the axis direction with respect to the outside of the substrate housing part 40 (see FIG. 5). Steps 3a, 3b are formed in the gap between the ribs 41A and the gap between the ribs 41B in the base part 3, respectively.

A plurality (four in the embodiment) of pins 43 to 46 are provided in the substrate housing part 40. The plurality of pins 43 to 46 are a first pin 43 (positioning part) provided in a corner part corresponding to a corner of the base plate 2, a second pin 44 provided close to the ribs 41A, a third pin 45 provided close to the ribs 41B, and a fourth pin 46 provided between the second pin 44 and the third pin 45. The respective pins 43 to 46 are formed in cylinder shapes and stood from the base part 3 of the base plate 2 toward the outside in the axis direction.

The tip end of the first pin 43 is provided in the same position as that of the end of the peripheral wall part 4 in the axis direction. The first pin 43 has a larger-diameter portion 43a formed on the base end, a smaller-diameter portion 43b formed on the tip end, and a different-diameter step surface 43c formed between the larger-diameter portion 43a and the smaller-diameter portion 43b. The different-diameter step surface 43c faces the outside in the axis direction and is formed in a flat surface orthogonal to the axis direction. The different-diameter step surface 43c is located in the same position as those of the end of the opening wall part 7 and the ends of the ribs 41A, 41B in the axis direction.

An outer circumference surface 43d (wall surface) of the larger-diameter portion 43a of the first pin 43 extends from the base part 3 toward the outside in the axis direction. A corner portion 43e extending along the direction orthogonal to the axis direction is formed on the entire of the outer circumference surface 43d of the larger-diameter portion 43a. The corner portion 43e is formed nearly at a right angle in the longitudinal sectional view of the first pin 43. The corner portion 43e is a step portion provided by formation of the tip end of the larger-diameter portion 43a to be slightly smaller than the base end. The corner portion 43e is provided between the respective blades 23, 24, 28 and the flexible substrate 6 in the axis direction.

The tip end of the second pin 44 is provided in the same position as that of the tip end of the first pin 43 in the axis direction. An outer circumference surface 44a (wall surface) of the second pin 44 extends from the base part 3 toward the outside in the axis direction. A corner portion 44b extending along the direction orthogonal to the axis direction is formed on the entire of the outer circumference surface 44a of the second pin 44. The corner portion 44b is formed nearly at a right angle in the longitudinal sectional view of the second pin 44. The corner portion 44b is a step portion provided by formation of the tip end of the second pin 44 to be slightly smaller than the base end. The corner portion 44b is provided in the same position as that of the corner portion 43e of the first pin 43 in the axis direction.

The tip end of the third pin 45 is chamfered. The tip end of the third pin 45 is provided in the same position as those of the end of the opening wall part 7 and the ends of the ribs 41A, 41B in the axis direction.

The tip end of the fourth pin 46 is provided in the same position as those of the end of the opening wall part 7 and the ends of the ribs 41A, 41B in the axis direction.

An intermission portion 4a is provided in the peripheral wall part 4 in the substrate housing part 40. Further, an inner wall surface 4b (wall surface) of the peripheral wall part 4 in the substrate housing part 40 extends from the base part 3 toward the outside. A corner portion 4c extending along the direction orthogonal to the axis direction is formed on the inner wall surface 4b over nearly the entire of the region corresponding to the substrate housing part 40. The corner portion 4c is formed nearly at a right angle in the sectional view seen in the plane along the axis direction. The corner portion 4c is a step portion having a step surface facing the outside in the axis direction. The corner portion 4c is provided in the same position as that of the corner portion 43e of the first pin 43 in the axis direction.

As shown in FIG. 3, the respective actuators 10A, 10B are provided between the base plate 2 and the respective blades 23, 24, 28.

The first actuator 10A includes a rotor 11A with a permanent magnet, a stator 12A on which a magnetic force acts between the rotor 11A and itself by excitation, and a coil 13A for exciting the stator 12A. The rotor 11A is rotatably supported by the base plate 2. A drive pin 14A is provided in the rotor 11A. The respective shutter blades 23, 24 are coupled to the drive pin 14A. The first actuator 10A is provided in a corner region adjacent to the corner region of the base plate 2 in which the substrate housing part 40 is provided.

The second actuator 10B has the same configuration as the first actuator 10A. That is, the second actuator 10B includes a rotor 11B with a permanent magnet, a stator 12B on which a magnetic force acts between the rotor 11B and itself by excitation, and a coil 13B for exciting the stator 12B. The rotor 11B is rotatably supported by the base plate 2. A drive pin 14B is provided in the rotor 11B. The aperture blade 28 is coupled to the drive pin 14B. Of the corner regions of the base plate 2, the second actuator 10B is provided in a corner region opposite to the corner region in which the first actuator 10A is provided with the opening 5 of the base plate 2 in between.

As shown in FIG. 4, the flexible substrate 6 with wiring (not shown) formed thereon is held by the base plate 2. The flexible substrate 6 is introduced from the outside of the peripheral wall part 4 of the base plate 2 through the intermission portion 4a into the substrate housing part 40. The flexible substrate 6 is fixed to the base part 3 of the base plate 2 by a double-sided tape or the like, for example. Further, the flexible substrate 6 is connected to the control unit 102 (see FIG. 1) in a terminal portion 6d formed on the end located outside of the substrate housing part 40.

A pair of insertion holes 6a, 6b are formed in the flexible substrate 6. The insertion holes 6a, 6b are formed to correspond to the first pin 43 and the fourth pin 46 within the substrate housing part 40, respectively. The pins 43, 46 are inserted into the insertion holes 6a, 6b, respectively, and the flexible substrate 6 (inner circumference edges of the insertion holes 6a, 6b) is in contact with the pins 43, 46.

The flexible substrate 6 connects to the coils 13A, 13B of the respective actuators 10A, 10B (see FIG. 3) via the conductor wires 9 in the substrate housing part 40. The flexible substrate 6 and the conductor wires 9 are joined by solder or the like, for example, on joint portions 6c on the surface of the flexible substrate 6 facing the outside in the axis direction. As shown in FIG. 5, the joint portions 6c are covered by the covering material 8 of a resin material such as silicone. The covering material 8 is applied over both the surface of the flexible substrate 6 facing the outside in the axis direction and the other regions than the flexible substrate 6 in the substrate housing part 40.

As shown in FIG. 3, the above described respective blades 23, 24, 28, a first blade receiving plate 21 (blade receiving plate) disposed between the respective blades 23, 24, 28 and the opening 5, a second blade receiving plate 26 disposed between the respective shutter blades 23, 24 and the aperture blade 28, and a holding plate 30 disposed on the outside of the respective blades 23, 24, 28 in the axis direction are disposed outside of the opening 5 in the axis direction inside of the peripheral wall part 4 of the base plate 2.

The first blade receiving plate 21 is formed in a rectangular plate shape using a resin material or the like, for example. The first blade receiving plate 21 is formed to be slightly smaller than the inner shape of the peripheral wall part 4 of the base plate 2 as seen in the axis direction. The first blade receiving plate 21 has a first receiving plate opening 22 (receiving plate opening) on the optical axis P. The inner diameter of the first receiving plate opening 22 is smaller than the inner diameter of the opening 5 of the base plate 2. Further, a through hole 21a in which the smaller-diameter portion 43b of the first pin 43 provided in the substrate housing part 40 of the base plate 2 is inserted, a notch portion 21b in which the second pin 44 is placed, through holes 21c, 21d, 21e, 21f in which pins 2a, 2b, 2c, 2d provided outside of the substrate housing part 40 of the base plate 2 are inserted, a relief hole 21g for relieving the movement of the drive pin 14A provided in the rotor 11A of the first actuator 10A, and a relief hole 21h for relieving the movement of the drive pin 14B provided in the rotor 11B of the second actuator 10B are formed in the first blade receiving plate 21. The first blade receiving plate 21 is mounted on the end of the opening wall part 7 of the base plate 2, the ends of the ribs 41A, 41B, the different-diameter step surface 43c of the first pin 43, and the tip ends of the third pin 45 and the fourth pin 46 (see FIGS. 4 and 5).

The second blade receiving plate 26 is formed in a rectangular plate shape nearly the same as the first blade receiving plate 21 using a resin material or the like, for example. The second blade receiving plate 26 has a second receiving plate opening 27 on the optical axis P. The inner diameter of the second receiving plate opening 27 is equal to the inner diameter of the first receiving plate opening 22 of the first blade receiving plate 21. Further, through holes 26a, 26b in which the smaller-diameter portion 43b of the first pin 43 and the second pin 44 of the base plate 2 are inserted, through holes 26c, 26d, 26e, 26f in which the pins 2a, 2b, 2c, 2d of the base plate 2 are inserted, a relief hole 26g for relieving the movement of the drive pin 14A of the first actuator 10A, and a relief hole 26h for relieving the movement of the drive pin 14B of the second actuator 10B are formed in the second blade receiving plate 26.

The respective shutter blades 23, 24 are provided between the first blade receiving plate 21 and the second blade receiving plate 26. The respective shutter blades 23, 24 open and close the opening 5 of the base plate 2. A supporting hole 23a that engages with the pin 2a of the base plate 2 and a cam hole 23b that engages with the drive pin 14A of the first actuator 10A are formed in the first shutter blade 23. A supporting hole 24a that engages with the pin 2b of the base plate 2 and a cam hole 24b that engages with the drive pin 14A of the first actuator 10A are formed in the second shutter blade 24. The respective shutter blades 23, 24 are driven by the rotor 11A of the first actuator 10A and simultaneously rotate about the pins 2a, 2b, respectively, and move between a retracting state in which the blades retract from the opening 5 of the base plate 2 and a closing state in which the blades close the opening 5. In this regard, the respective shutter blades 23, 24 rotate along the surface (working surface) orthogonal to the axis direction between the first blade receiving plate 21 and the second blade receiving plate 26.

The respective shutter blades 23, 24 come into contact with the base plate 2 in the retracting state and the closing state so that the rotation positions may be restricted. Specifically, in the retracting state, the first shutter blade 23 is in contact with the peripheral wall part 4 of the base plate 2 and the second shutter blade 24 is in contact with the first pin 43 and the second pin 44 of the base plate 2. Further, in the closing state, the first shutter blade 23 is in contact with the first pin 43 of the base plate 2 and the second shutter blade 24 is in contact with the peripheral wall part 4 of the base plate 2.

The aperture blade 28 restricts the opening area of the opening 5 of the base plate 2. A supporting hole 28a that engages with the pin 2c of the base plate 2 and a cam hole 28b that engages with the drive pin 14B of the second actuator 10B are formed in the base end of the aperture blade 28. The end of the aperture blade 28 is formed to be wider. The aperture blade 28 is driven by the rotor 11B of the second actuator 10B and rotates about the pin 2c and moves between a state in which the blade retracts from the second receiving plate opening 27 of the second blade receiving plate 26 and a state in which the blade covers the second receiving plate opening 27. In this regard, the aperture blade 28 rotates along the surface (working surface) orthogonal to the axis direction between the second blade receiving plate 26 and the holding plate 30. The aperture blade 28 comes into contact with the base plate 2 in the state in which the blade retracts from the second receiving plate opening 27 and the state in which the blade covers the second receiving plate opening 27 so that the rotation position may be restricted. Specifically, in the state in which the blade retracts from the second receiving plate opening 27, the aperture blade 28 is in contact with the peripheral wall part 4 of the base plate 2, and, in the state in which the blade covers the second receiving plate opening 27, the aperture blade 28 is in contact with the pin 2d of the base plate 2.

The end of the aperture blade 28 is formed to completely overlap with the second receiving plate opening 27 in the state in which the blade covers the second receiving plate opening 27. Further, a small aperture hole 29 provided around the optical axis P in the state in which the blade covers the second receiving plate opening 27 is formed in the end of the aperture blade 28. The inner diameter of the small aperture hole 29 is smaller than the inner diameter of the second receiving plate opening 27. The aperture blade 28 reduces an amount of light passing through the second receiving plate opening 27 by the small aperture hole 29 in the state in which the blade covers the second receiving plate opening 27.

The holding plate 30 is formed in nearly the same rectangular shape as those of the first blade receiving plate 21 and the second blade receiving plate 26 as seen from the axis direction. An opening 31 formed around the optical axis P and through holes 30a, 30b in which the smaller-diameter portion 43b of the first pin 43 and the second pin 44 of the base plate 2 are inserted, through holes 30c, 30d, 30e, 30f in which the pins 2a, 2b, 2c, 2d of the base plate 2 are inserted, a relief hole 30g for relieving the movement of the drive pin 14A of the first actuator 10A, and a relief hole 30h for relieving the movement of the drive pin 14B of the second actuator 10B are formed in the holding plate 30 like the first blade receiving plate 21 and the second blade receiving plate 26. The inner diameter of the opening 31 is equal to the inner diameters of the respective receiving plate opening 22, 27 of the respective blade receiving plates 21, 26. Further, a plurality of latch parts 32 to be locked to the base plate 2 are formed on the outer peripheral edge of the holding plate 30. Thereby, the holding plate 30 covers the inside of the peripheral wall part 4 of the base plate 2 in a state in which the respective blades 23, 24, 28 and the respective blade receiving plates 21, 26 are placed inside of the peripheral wall part 4 of the base plate 2.

As below, the operation of the blade drive device 1 of the embodiment will be explained.

When the flexible substrate 6 is attached to the base plate 2, the flexible substrate 6 is placed into the substrate housing part 40 through the intermission portion 4a of the peripheral wall part 4 and the first pin 43 and the fourth pin 46 of the base plate 2 are inserted into the insertion holes 6a, 6b, respectively. The flexible substrate 6 is fixed to the base part 3 of the base plate 2 using a double-sided tape, for example. In this regard, the inner circumference edges of the insertion holes 6a, 6b and the respective pins 43, 46 are brought into contact, and thereby, the flexible substrate 6 may be positioned with respect to the base plate 2.

The conductor wires 9 connected to the coils 13A, 13B of the respective actuators 10A, 10B are joined by solder to the joint portions 6c of the flexible substrate 6 placed in the substrate housing part 40. Further, the covering material 8 is applied to cover the joint portions 6c to which the conductor wires 9 are joined within the substrate housing part 40. In this regard, the covering material 8 is applied over both the flexible substrate 6 and the other regions than the flexible substrate 6 in the substrate housing part 40. Thereby, flying of solder or fluxes contained in the solder from the joint portions 6c as foreign matter may be prevented, and the flexible substrate 6 and the base plate 2 may be fastened more strongly.

The covering material 8 applied within the substrate housing part 40 has fluidity and may wetting-spread due to surface tension. In this case, the material may wetting-spread toward the outside in the axis direction via the inner wall surface 4b of the peripheral wall part 4, the outer circumference surface 43d of the first pin 43, and the outer circumference surface 44a of the second pin 44 (hereinafter, referred to as "wall surfaces 4b, 43d, 44a").

Here, generally, when a material having fluidity wetting-spreads on a member surface due to surface tension, if a corner portion is formed on the member surface, wetting-spread over the corner portion is restricted.

In the embodiment, on the wall surfaces 4b, 43d, 44a, the corner portions 4c, 43e, 44b extending along the direction orthogonal to the axis direction are formed between the respective shutter blades 23, 24 and the flexible substrate 6 in the axis direction. Accordingly, as shown in FIG. 5, wetting-spread of the covering material 8 applied on the flexible substrate 6 within the substrate housing part 40 toward the outside in the axis direction may be restricted in the corner portions 4c, 43e, 44b on the wall surfaces 4b, 43d, 44a. Thereby, entrance of the covering material 8 into the working surfaces of the respective blades 23, 24, 28 may be prevented. As a result, adherence of the covering material 8 to the movable parts (e.g. the contact parts between the second shutter blade 24 and the first pin 43 and the second pin 44 of the base plate 2) of the respective blades 23, 24, 28 may be prevented. Therefore, malfunction of the respective blades 23, 24, 28 may be prevented.

In addition, wetting-spread of the covering material 8 in the axis direction may be restricted by the corner portions 4c, 43e, 44b of the wall surfaces 4b, 43d, 44a, and thus, the respective blades 23, 24, 28 can be provided closer to the flexible substrate 6. Thereby, the dimension of the blade drive device 1 in the axis direction may be reduced. Therefore, the compact blade drive device 1 may be obtained.

Further, the corner portions 4c, 43e, 44b of the wall surfaces 4b, 43d, 44a are provided between the first blade receiving plate 21 and the flexible substrate 6, and thus, contact of the covering material 8 with the first blade receiving plate 21 may be prevented. Thereby, contact of the covering material 8 with the movable parts of the respective blades 23, 24, 28 via the first blade receiving plate 21 may be prevented.

In the base plate 2, the first pin 43 in contact with the flexible substrate 6 is formed and the corner portion 43e is formed on the outer circumference surface 43d of the first pin 43. Accordingly, the flexible substrate 6 may be positioned with respect to the base plate 2 and wetting-spread of the covering material 8 over the working surfaces of the respective blades 23, 24, 28 via the outer circumference surface 43d of the first pin 43 may be prevented. Therefore, malfunction of the respective blades 23, 24, 28 may be prevented.

The ribs 41A, 41B are stood from the inside to the outside in the axis direction in the substrate housing part 40, and thus, the covering material 8 applied within the substrate housing part 40 flowing out of the substrate housing part 40 may be restricted by the ribs 41A, 41B.

Further, the base part 3 in the substrate housing part 40 is recessed toward the inside in the axis direction with respect to the outside of the substrate housing part 40, and thus, the covering material 8 applied within the substrate housing part 40 flowing out of the substrate housing part 40 may be restricted more reliably.

Thereby, the application range of the covering material 8 may be defined and the wetting-spread of the covering material 8 over the working surfaces of the respective blades 23, 24, 28 via the outside of the substrate housing part 40 may be prevented. Therefore, malfunction of the respective blades 23, 24, 28 may be prevented.

The respective actuators 10A, 10B are provided between the working surfaces of the respective blades 23, 24, 28 and the base plate 2 and do not enter the working surfaces of the blades like the covering material 8 in the axis direction, and thus, compared with a configuration in which the respective actuators 10A, 10B are provided outside of the working surfaces of the respective blades 23, 24, 28, malfunction of the respective blades 23, 24, 28 may be prevented and the dimension of the blade drive device 1 in the axis direction may be reduced. Therefore, the compact blade drive device 1 may be obtained. Further, the respective actuators 10A, 10B overlap with the working ranges of the respective blades 23, 24, 28 on the plane orthogonal to the axis direction, and thus, the dimension may be also reduced in the plane orthogonal to the axis direction.

The optical apparatus 101 includes the above described blade drive device 1, and thus, malfunction of the respective blades 23, 24, 28 may be prevented. Moreover, flying of solder or fluxes contained in the solder from the joint portions 6c as foreign matter may be prevented by the covering material 8, and thus, defects including degradation of image quality due to adherence of foreign matter to the imaging device and malfunction due to adherence to the movable parts may be prevented. Therefore, the optical apparatus 101 advantageous in imaging performance may be obtained.

Note that the invention is not limited to the above described embodiment explained with reference to the drawings, but various modified examples may be considered within the technical scope.

For example, in the above described embodiment, the covering material 8 is formed using a resin material such as silicone, however, not limited to that. For example, a UV curing resin or the like may be used. Note that the resin material such as silicone that can be air-set is advantageous because the manufacturing process may be simplified.

Further, in the above described embodiment, the corner portions are provided on the inner wall surface 4b of the peripheral wall part 4, the outer circumference surface 43d of the first pin 43, and the outer circumference surface 44a of the second pin 44, however, not limited to those. For example, the corner portions may be formed only on the outer circumference surface 43d of the first pin 43 and the outer circumference surface 44a of the second pin 44, or formed on the wall surface of the opening wall part 7 in the substrate housing part 40 or the like.

Furthermore, in the above described embodiment, the corner portions 4c, 43e, 44b are formed nearly at right angles in the sectional view, however, not limited to those. The corner portions may be formed at obtuse angles or acute angles.

In addition, the component elements in the above described embodiment can be appropriately replaced by known component elements without departing from the scope of the invention.

What is claimed is:

1. A blade drive device comprising:
a shallow base frame having an outer peripheral wall, a bottom surface, an opening formed in the bottom surface and an inner peripheral wall standing along a periphery of the opening, the opening being configured to be opened and closed by a blade, wherein
an optical axis runs through the opening perpendicularly to the bottom surface,
the outer and inner peripheral walls stand from the bottom surface in an outer direction along the optical axis, and
the base frame is formed therein with a substrate chamber defined by the outer and inner peripheral walls;
a first blade receiving plate placed in the base frame in parallel with the bottom surface at a first distance measured in the outer direction from the bottom surface;
a second blade receiving plate placed in the base frame in parallel with the bottom surface at a distance measured in the outer direction from the first blade receiving plate, wherein the blade is movable in a space formed between the first and second blade receiving plates;
a pillar standing in the outer direction from the bottom surface in the substrate chamber and configured to position the first blade receiving plate at the first distance from the bottom surface;
a substrate placed in the substrate chamber of the base frame between the bottom surface of the base frame and the first blade receiving plate, wherein the substrate has a joint portion to which a conductor wire of a drive source that drives the blade is joined;
a covering material layered on the substrate in the substrate chamber so that the covering material covers the joint portion; and
a step formed to extend in parallel with the bottom surface at least one of (i) around a circumferential surface of the pillar or (ii) along an inner surface of the outer peripheral wall defining the substrate chamber, the step being formed at a second distance measured in the outer direction from the bottom surface, the second distance being shorter than the first distance, wherein the covering material has an outer edge standing from the bottom surface in the outer direction, and the step terminates the outer edge of the covering material at the second distance from the bottom surface.

2. The blade drive device according to claim 1, further comprising a second pillar standing in the outer direction from the bottom surface in the substrate chamber and configured to position the first blade receiving plate at the first distance from the bottom surface, wherein the second pillar is formed with the step at the second distance from the bottom surface.

3. The blade drive device according to claim 1, further comprising a rib standing from the bottom surface between the outer and inner periphery walls and configured to define the substrate chamber.

4. The blade drive device according to claim 1, wherein the drive source is disposed in the base frame between the bottom surface and the first blade receiving plate.

5. An optical apparatus comprising the blade drive device according to claim 1.

* * * * *